United States Patent [19]

Franz

[11] Patent Number: 5,173,601
[45] Date of Patent: Dec. 22, 1992

[54] ANGLE MEASURING DEVICE WITH CORRECTION GRID

[75] Inventor: Andreas Franz, Kienberg, Fed. Rep. of Germany

[73] Assignee: Dr. Johannes Heidenhain GmbH, Traunreut, Fed. Rep. of Germany

[21] Appl. No.: 691,533

[22] Filed: Apr. 25, 1991

[30] Foreign Application Priority Data

Apr. 27, 1990 [DE] Fed. Rep. of Germany ....... 4013566

[51] Int. Cl.$^5$ ............................................. G01D 5/34
[52] U.S. Cl. ............................ 250/231.16; 250/237 G
[58] Field of Search ................... 250/231.14, 231.16, 250/237 G; 356/345, 374, 356

[56] References Cited

U.S. PATENT DOCUMENTS

| | | | |
|---|---|---|---|
| 3,612,695 | 10/1971 | Bouwhuis et al. | 250/237 G |
| 3,628,026 | 12/1971 | Cronin | 250/237 G |
| 4,629,886 | 12/1986 | Akiyama et al. | 250/237 G |
| 4,792,678 | 12/1988 | Spies | 250/237 G |
| 4,923,300 | 5/1990 | Michel et al. | 356/356 |
| 4,938,595 | 7/1990 | Parriaux et al. | 250/237 G |
| 4,955,718 | 9/1990 | Michel | 356/356 |
| 4,975,570 | 12/1990 | Nishimura et al. | 250/231.16 |
| 5,001,340 | 3/1991 | Schwefel et al. | 250/237 G |
| 5,017,777 | 5/1991 | Ishizuka et al. | 250/231.16 |
| 5,066,857 | 11/1991 | Ernst | 250/231.15 |

FOREIGN PATENT DOCUMENTS

| | | |
|---|---|---|
| 3702314C1 | 1/1988 | Fed. Rep. of Germany . |
| 3625327C1 | 2/1988 | Fed. Rep. of Germany . |
| 3633574 | 4/1988 | Fed. Rep. of Germany . |
| 3705653C1 | 7/1988 | Fed. Rep. of Germany . |
| 3816247A1 | 12/1988 | Fed. Rep. of Germany . |
| 63-277923 | 11/1988 | Japan . |
| 63-277924 | 11/1988 | Japan . |
| 63-277925 | 11/1988 | Japan . |
| 63-277926 | 11/1988 | Japan . |

OTHER PUBLICATIONS

"Laser Rotary Encoders," Nishimura et al., Motion Jul./Aug. 1986, pp. 3-4.
"Laser Rotary Encoders," Nishimura et al., Motion, Sep./Oct. 1986, pp. 14-18.
"Photoelectrical Measurement of the Change of Lengths or Angular Positions with the Help of Diffraction Lattices," Hock, Dissertation Approved by the University of Stuttgart, submitted Oct. 29, 1975, pp. 183-184.

Primary Examiner—David C. Nelms
Assistant Examiner—S. Allen
Attorney, Agent, or Firm—Willian Brinks Olds Hofer Gilson & Lione

[57] ABSTRACT

An interference type angle measuring device has a graduated disk with a circular graduation. This circular graduation is scanned by a scanning device, which is constructed as a monolithically integrated optical circuit with two diametrical scanning areas. Simply structured coupling and decoupling grids are used as coupling elements, which have also simply constructed correction grids placed upstream or downstream thereof.

12 Claims, 1 Drawing Sheet

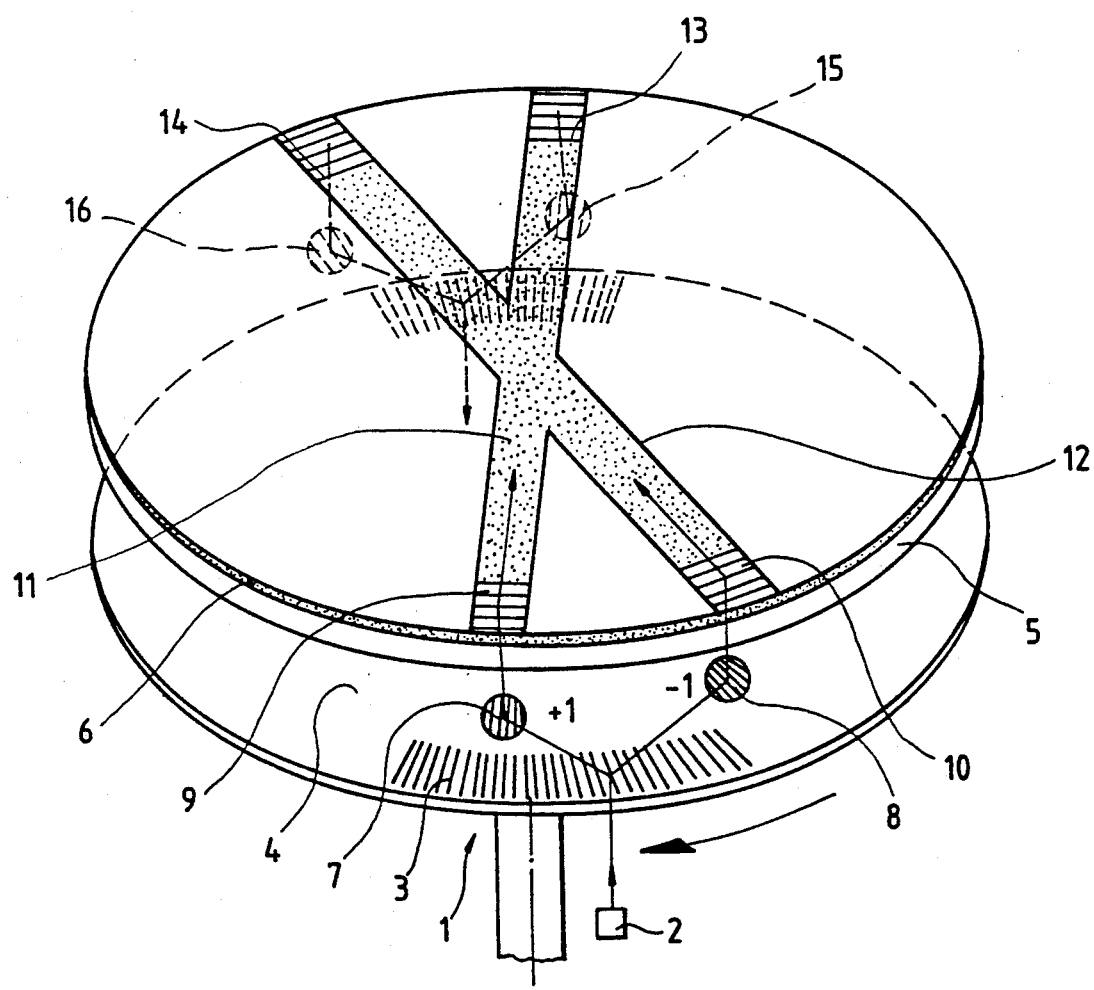

ANGLE MEASURING DEVICE WITH CORRECTION GRID

FIELD OF THE INVENTION

This invention relates to an interference type photoelectric angle measuring device of the type having a scale with a circular graduation, a scanning device of integrated-optical construction for diametrically scanning the circular graduation, and coupling elements for coupling and/or decoupling diffracted beam clusters into and/or out of the integrated-optical construction.

BACKGROUND OF THE INVENTION

Angle measuring devices of the type described above are employed in particular in machine tools for measuring the relative position of a tool in respect to a workpiece to be processed.

A simply constructed and therefore inexpensive to manufacture angle measuring device of small dimensions is described in German DE-C2-36 33 574. The disclosed angle measuring device is insensitive to wobble errors of the scale and eccentricity errors are eliminated.

An integrated-optical angle transmitter requires coupling grids which correctly couple the beam clusters, which have been diffracted in the measuring body, into suitable wave guide structures. The shape of the grid lines of such coupling grids is described by means of complicated lathematical expressions. Because of the extreme fineness of these coupling grids (grid constant $<0.5\ \mu m$), it is extremely difficult to produce them with the required exactness.

SUMMARY OF THE INVENTION

An important object of the present invention is to provide an angle measuring device of the type described above, where the coupling elements for coupling and/or decoupling diffracted beam clusters to integrated-optical structures can be made in a simpler way.

This object is attained by an angle measuring device wherein for structural simplification a simple further grid is placed upstream and/or downstream of at least one of the coupling elements.

The advantages of the invention are found in the problem-free manufacture of the scanning device for the angle measuring device, based on the reduction of complicated coupling elements to simple grids.

The invention will be described in more detail by means of a largely schematic illustration.

BRIEF DESCRIPTION OF THE DRAWING

The single FIGURE is a schematic illustration of the presently preferred embodiment of the angle measuring device of the invention.

DETAILED DESCRIPTION OF THE PREFERRED EMBODIMENT

In an angle measuring device 1 schematically illustrated in the FIGURE, light from a laser 2 falls in a first scanning area on a circular graduation 3 of a graduated disk 4. The light is diffracted at the circular graduation 3, which is in the form of a phase grid, and two partial beam clusters +1 and −1 of the first diffraction order are generated. Additional diffraction orders are not evaluated in the device 1.

A scanning device, not further described, includes a substrate 5 supporting a monolithically integrated structure 6.

The partial beam clusters +1 and −1 of the positive first diffraction order and the negative first diffraction order, generated by diffraction at the phase grid of the circular graduation 3, impinge on correction grids 7 and 8, by which they are deflected in such a way that they enter the substrate 5 vertically and with a straight wave front. The correction grids 7 and 8 may be disposed on the underside of the substrate 5 and may have a very simple grid structure, possibly even that of the radial circular graduation 3. The correction grids 7 and 8 have grid constants on the same order as the circular graduation 3 (5 $\mu m$) and can be manufactured relatively simply. The partial beam clusters +1 and −1 deflected by the correction grids 7 and 8 impinge in the integrated-optical structure 6 on coupling grids 9 and 10, which are in the shape of simple linear or circular grids. By means of the coupling grids 9 and 10, the partial beam clusters +1 and −1 are fed into planar wave guides 11 and 12 and are guided to diametrically disposed decoupling grids 13 and 14.

The decoupling grids 13 and 14 direct the partial beam clusters +1 and −1 via further correction grids 15 and 16 back to the circular graduation 3, where they are brought to interference and are sensed by detectors (not shown, but situated as indicated by the arrow on the dotted line beneath the further correction grids 15 and 16). Based on the relative movements between the substrate 5 and the graduated disk 4, the phase positions of the beam clusters at the detectors, which have been twice diffracted at the circular graduation 3, change in a known manner, so that signals are generated by the detectors, whose periods correspond to one quarter of the graduation period of the circular graduation 3.

Eccentricity, if it is present, is eliminated by means of the double scanning in diametrical scanning areas.

The structure and the geometric disposition shown in the exemplary embodiment are, of course, highly schematic, because it is hardly possible to illustrate the actual conditions in optically integrated components realistically by means of drawings.

In contrast to the exemplary embodiment described, the grids mentioned need not be in the form of phase grids, which are nothing more than a preferred embodiment.

What is claimed is:

1. In an interference type photoelectric angle measuring device, of the type comprising a scale with a circular graduation, a scanning device of integrated-optical construction for diametrically scanning the circular graduation, and at least one coupling element having a light input portion and a light output portion for coupling a diffracted beam cluster into the integrated-optical construction, the improvement comprising:
   at least one simple further grid placed to interact with light before entering the light input portion of the coupling element.

2. The photoelectric angle measuring device of claim 1, wherein the coupling element comprises a linear coupling grid, and wherein the further grid is configured to direct the beam cluster, which is to be coupled, vertically and with a straight wave front onto the coupling grid.

3. The photoelectric angle measuring device of claim 1 wherein the circular graduation comprises a radial grid, and wherein the further grid comprises a grid which is identical with the radial grid of the circular graduation.

4. The photoelectric angle measuring device of claim 1 wherein the further grid comprises a correction grid.

5. The photoelectric angle measuring device of claim 1 wherein the device further comprises at least one additional coupling element having a light input portion and a light output portion for decoupling the diffracted beam cluster out of the intergrated-optical construction, and wherein the improvement further comprises:

an additional simple further grid placed to interact with light after leaving the light output portion of the additional coupling element.

6. In an interference type photoelectric angle measuring device, of the type comprising a scale with a circular graduation, a scanning device of integrated-optical construction for diametrically scanning the circular graduation, and at least one coupling element having a light input portion and a light output portion for decoupling a diffracted beam cluster out of the integrated-optical construction, the improvement comprising:

a simple further grid placed to interact with light after leaving the light output portion of the coupling element.

7. The photoelectric angle measuring device of claim 6 wherein the circular graduation comprises a radial grid, and wherein the further grid comprises a grid which is identical with the radial grid of the circular graduation.

8. The photoelectric angle measuring device of claim 6 wherein the further grid comprises a correction grid.

9. The photoelectric angle measuring device of claim 1 wherein the coupling element comprises a grid element.

10. The photoelectric angle measuring device of claim 5 wherein the additional coupling element comprises a grid element.

11. The photoelectric angle measuring device of claim 5 wherein the additional simple further grid comprises a correction grid.

12. The photoelectric angle measuring device of claim 6 wherein the coupling element comprises a grid element.

* * * * *